(12) United States Patent
Adachi et al.

(10) Patent No.: US 10,917,890 B2
(45) Date of Patent: Feb. 9, 2021

(54) COMMUNICATION DEVICE AND PROCESSOR

(71) Applicant: KYOCERA CORPORATION, Kyoto (JP)

(72) Inventors: Hiroyuki Adachi, Kawasaki (JP); Masato Fujishiro, Yokohama (JP); Mayumi Komura, Yokohama (JP); Kugo Morita, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/272,207

(22) Filed: Feb. 11, 2019

(65) Prior Publication Data

US 2019/0174503 A1 Jun. 6, 2019

Related U.S. Application Data

(63) Continuation of application No. PCT/JP2017/028453, filed on Aug. 4, 2017.

(60) Provisional application No. 62/374,223, filed on Aug. 12, 2016.

(51) Int. Cl.
| | |
|---|---|
| *H04L 12/28* | (2006.01) |
| *H04W 72/04* | (2009.01) |
| *H04W 92/18* | (2009.01) |
| *H04W 4/021* | (2018.01) |
| *H04W 64/00* | (2009.01) |
| *H04W 72/12* | (2009.01) |
| *H04W 72/02* | (2009.01) |

(52) U.S. Cl.
CPC ....... *H04W 72/0453* (2013.01); *H04W 4/021* (2013.01); *H04W 64/003* (2013.01); *H04W 72/048* (2013.01); *H04W 72/121* (2013.01); *H04W 92/18* (2013.01); *H04W 72/02* (2013.01)

(58) Field of Classification Search
CPC ...................................................... H04L 12/28
USPC ............................................................ 370/329
See application file for complete search history.

(56) References Cited

U.S. PATENT DOCUMENTS

2019/0174278 A1* 6/2019 Fujishiro ............... H04W 72/04

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.4.0, Jun. 2016, pp. 1-310, Valbonne, France.
LG Electronics Inc., Geo-Information based resource allocation, 3GPP TSG RAN2 Meeting #94, R2-164216, May 23-27, 2016, pp. 1-4, Nanjing, China.

(Continued)

*Primary Examiner* — Dang T Ton
(74) *Attorney, Agent, or Firm* — Studebaker & Brackett PC

(57) ABSTRACT

A communication device according to one embodiment includes a controller and a transmitter. The controller is configured to identify a zone that is a geographical section where the communication device is located, and select a predetermined transmission resource region from a plurality of transmission resource regions included in one transmission resource pool associated with the identified zone. The transmitter is configured to transmit a direct radio signal to another communication device by using a resource in the predetermined transmission resource region.

8 Claims, 11 Drawing Sheets

(56) References Cited

OTHER PUBLICATIONS

Qualcomm Incorporated, Support of communication group priority and half duplex resolution, 3GPP TSG RAN Working Group 1 #82, R1-154724, Aug. 24-28, 2015, pp. 1-7, Beijing, China.

Intel Corporation, On combination of sensing and geo-based transmission techniques for sidelink V2V communication, 3GPP TSG RAN Working Group 1 Meeting #84bis, R1-162933, Apr. 11-15, 2016, pp. 1-6, Busan, Korea.

CATR, Resource allocation and selection enhancement for V2V communications, 3GPP TSG RAN Working Group 1 Meeting #84bis, R1-163128, Apr. 11-15, 2016, pp. 1-5, Busan, Korea.

\* cited by examiner

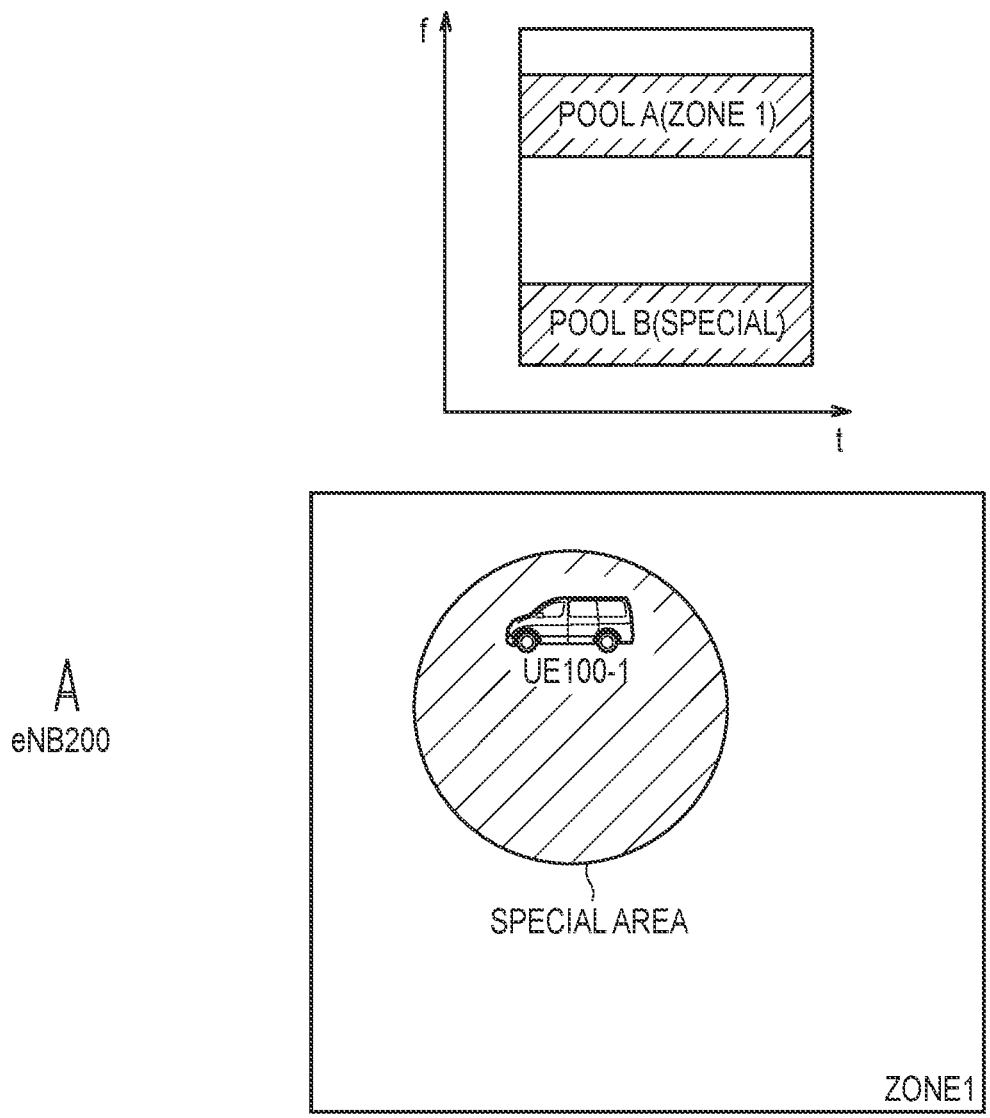

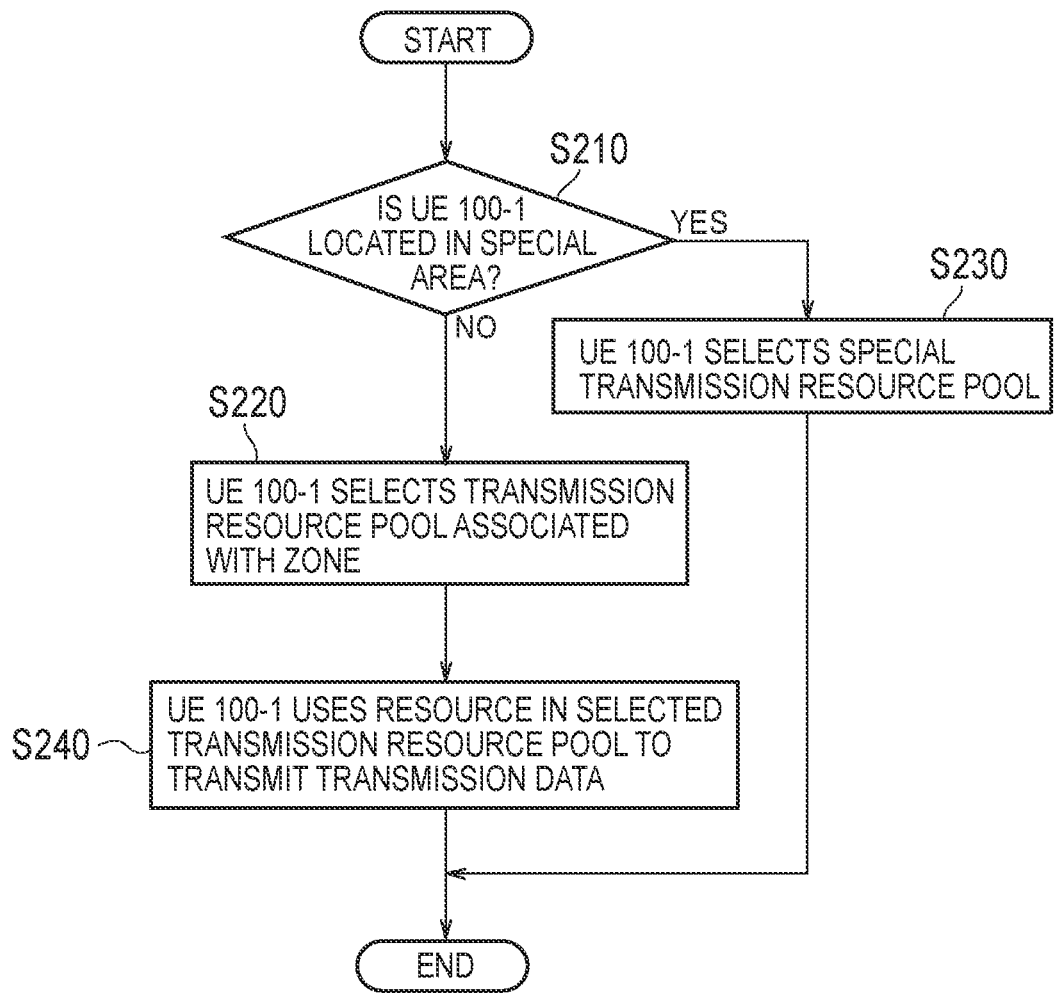

COMMUNICATION DEVICE AND PROCESSOR

CROSS-REFERENCE TO RELATED APPLICATION

The present application is a continuation based on PCT Application No. PCT/JP2017/028453 filed on Aug. 4, 2017, which claims the benefit of U.S. Provisional Application No. 62/374,223 (filed on Aug. 12, 2016). The content of which are incorporated by reference herein in their entirety.

FIELD

The present disclosure relates to a communication device and a processor.

BACKGROUND

In 3GPP (3rd Generation Partnership Project) which is a project aiming to standardize a mobile communication system, specifications for direct signaling (Sidelink) between devices are being formulated.

SUMMARY

A communication device according to one embodiment comprises a controller and a transmitter. The controller is configured to: identify a zone that is a geographical section where the communication device is located; and select a predetermined transmission resource region from a plurality of transmission resource regions included in one transmission resource pool associated with the identified zone. The transmitter is configured to transmit a direct radio signal to another communication device by using a resource in the predetermined transmission resource region.

A processor according to one embodiment is a processor for controlling a communication device. The processor executes: a process of identifying a zone that is a geographical section where the communication device is located, a process of selecting a predetermined transmission resource region from a plurality of transmission resource regions included in one transmission resource pool associated with the identified zone, and a process of transmitting a direct radio signal to another communication device by using a resource in the predetermined transmission resource region.

BRIEF DESCRIPTION OF THE DRAWINGS

FIG. 12 is a diagram for describing an operation pattern 4.
FIG. 13 is a flowchart for describing the operation pattern 4.

DESCRIPTION OF THE EMBODIMENT

Overview of Embodiment

Figure 1:
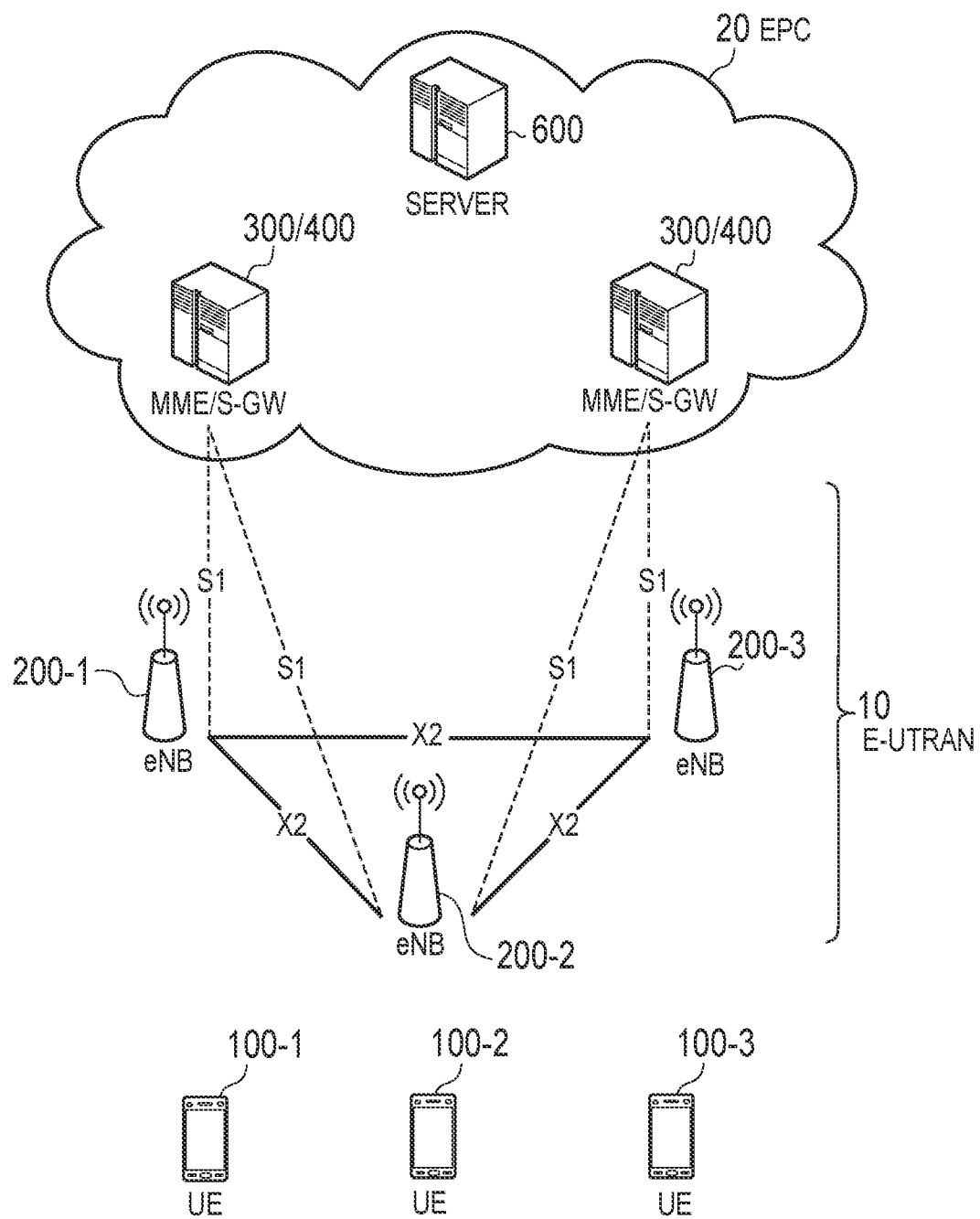
FIG. 1 is a diagram illustrating a configuration of an LTE system.

When a vehicle including a communication device executes a vehicle-to-vehicle (V2V) communication on a sidelink, the use of a transmission resource pool corresponding to the location of the vehicle has been discussed.

For example, the communication device included in the vehicle acquires location information indicating the actual location. It is assumed that the communication device transmits a radio signal on the sidelink based on a transmission resource pool associated with the actual location.

If a plurality of communication devices use the same transmission resource pool, radio signals may collide.

A communication device according to one embodiment comprises a controller and a transmitter. The controller is configured to: identify a zone that is a geographical section where the communication device is located; and select a predetermined transmission resource region from a plurality of transmission resource regions included in one transmission resource pool associated with the identified zone. The transmitter is configured to transmit a direct radio signal to another communication device by using a resource in the predetermined transmission resource region.

The controller may be configured to perform a measurement of a radio signal in the plurality of transmission resource regions. The controller may be configured to select the predetermined transmission resource region in accordance with a result of the measurement.

The controller may be configured to select the predetermined transmission resource region according to a congestion degree based on the result of the measurement.

The controller may be configured to select the predetermined transmission resource region based on a threshold value to be compared with the result of the measurement.

The controller may be configured to select the predetermined transmission resource region based on a priority of transmission data to be transmitted using the direct radio signal.

The one transmission resource pool may include a plurality of transmission resource regions arranged in a frequency direction.

The controller may be configured to: select configuration information in accordance with a movement speed of the communication device; and select the predetermined transmission resource region from the plurality of transmission resource regions included in the one transmission resource pool, based on the selected configuration information.

A processor according to one embodiment is a processor for controlling a communication device. The processor executes: a process of identifying a zone that is a geographical section where the communication device is located, a process of selecting a predetermined transmission resource region from a plurality of transmission resource regions included in one transmission resource pool associated with the identified zone, and a process of transmitting a direct radio signal to another communication device by using a resource in the predetermined transmission resource region.

A communication device according to one embodiment comprises a controller and a transmitter. The controller is configured to: identify a zone that is a geographical section where the communication device is located; and select a transmission resource region from a plurality of transmission resource regions associated with the identified zone. The transmitter is configured to transmit a direct radio signal to another communication device by using a resource in the transmission resource region.

The controller may be configured to perform a measurement of a radio signal in the plurality of transmission resource regions. The controller may be configured to select the transmission resource region in accordance with a result of the measurement.

The controller may be configured to select the transmission resource region based on predetermined information used for selecting the transmission resource region. The predetermined information may be associated with each transmission resource region.

The predetermined information may be at least one of a threshold value to be compared with the measurement result of the radio signal, a priority of the transmission data, and a measurement condition of the radio signal.

The plurality of transmission resource regions may be a plurality of transmission resource pools.

The plurality of transmission resource regions may constitute one transmission resource pool.

A communication device according to one embodiment includes a controller and a transmitter. The controller selects configuration information from a plurality of configuration information for calculating a zone which is a geographical section according to a situation of the communication device, and specifies, based on the selected configuration information, a zone in which the communication device is located, and selects a transmission resource region associated with the specified zone. The transmitter is configured to transmit a direct radio signal to another communication device using the resources in the transmission resource region.

The controller may be configured to select the configuration information according to at least one of priority of transmission data, movement speed of the communication device, and transmission power of the direct radio signal.

The configuration information may include parameters used for calculating the zone. The parameters included in each of the plurality of configuration information may be different from each other. The parameter may be at least one of a zone length, a zone width, a number of zones, and a minimum zone size.

A communication device according to one embodiment includes a controller and a transmitter. The controller is configured to specify a zone which is a geographical section where the communication device is located and to select a transmission resource area associated with the specified zone. The controller is configured to transmit a direct radio signal to another communication device using the resources in the transmission resource region. The controller is configured to select a special transmission resource region different from the transmission resource region in response to the communication device being located in a special area.

Embodiments (Mobile Communication System)

Hereinafter, an LTE system which is a mobile communication system according to the embodiments will be described. FIG. 1 is a diagram illustrating a configuration of an LTE system.

As illustrated in FIG. 1, the LTE system includes UE (User Equipment) 100, Evolved Universal Terrestrial Radio Access Network (E-UTRAN) 10, and Evolved Packet Core (EPC) 20.

The UE 100 corresponds to a communication apparatus (for example, a radio terminal). The UE 100 is a mobile communication apparatus. The UE 100 may be a vehicle (VUE (Vehicle UE) 100) having a communication function. The UE 100 may be the vehicle itself (e.g., a car, a motorcycle, etc.). The UE 100 may be a communication module detachable from the vehicle.

The UE 100 performs radio communication (Uplink/Downlink) with a cell (eNB 200 to be described later). UE 100 may be able to perform direct signaling transmission and/or reception with other communication apparatuses. For example, the UE 100 may be able to perform V2X (Vehicle-to-Everything) communication (e.g., V2V: Vehicle-to-Vehicle), road-to-vehicle communication (V2I: Vehicle-to-Infrastructure).

The E-UTRAN 10 corresponds to a radio access network. The E-UTRAN 10 includes eNBs (evolved Node-Bs) 200. The eNBs 200 correspond to base stations. The eNBs 200 are connected to each other via an X2 interface. The operation of the eNB 200 may be regarded as the operation of the E-UTRAN 10.

The eNB 200 manages one or a plurality of cells. The eNB 200 performs radio communication with the UE 100 that establishes a connection with a cell managed by the eNB 200. The eNB 200 has a radio resource management (RRM) function, a routing function of user data (hereinafter may be referred to as "data"), a measurement control function for mobility control/scheduling, and the like. "Cell" is used as a term indicating the minimum unit of radio communication area. The "cell" may also be used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300 and an SGW (Serving-Gateway) 400.

The MME 300 is, for example, configured to perform various types of mobility control for the UE 100. The SGW 400 is, for example, configured to perform transfer control of data. The MME 300 and the SGW 400 are connected to the eNB 200 via an S1 interface.

The EPC 20 may include a Server 600. The Server 600 may be, for example, a ProSe server that manages the ProSe function. The Server 600 may be a V2X server that manages the V2X (V2V/V2I) function. The Server 600 may be provided in the external network, not in the EPC 20.

Figure 2:
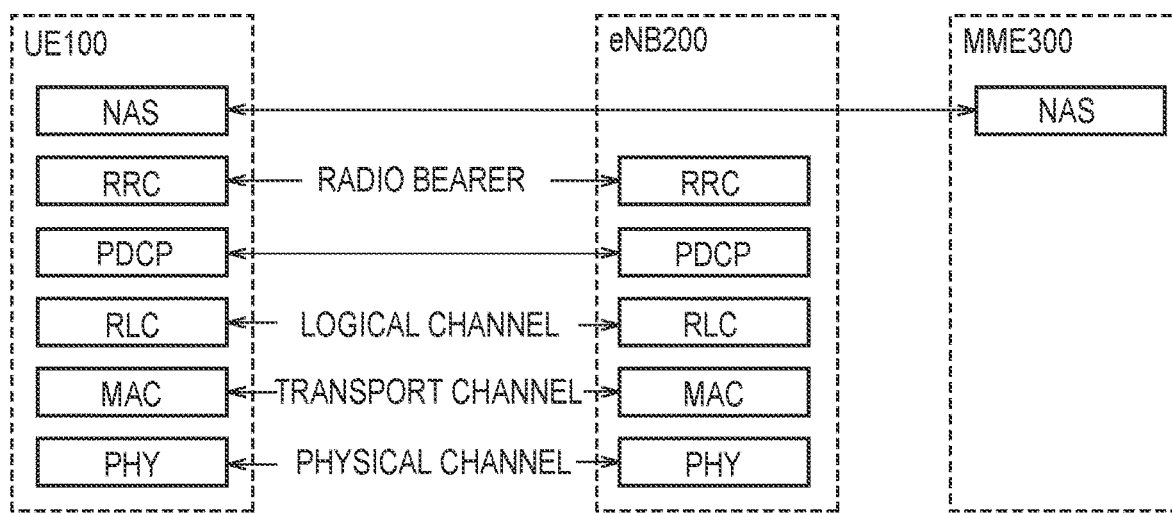
FIG. 2 is a protocol stack diagram of a radio interface in the LTE system.

FIG. 2 is a diagram illustrating a protocol stack of a radio interface in the LTE system. As illustrated in FIG. 2, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/emodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by Hybrid ARQ (HARQ), random access procedure, and the like. Between the MAC layer of the UE 100 and the MAC layer of the eNB 200, data and control signals are transmitted via the transport channel. The MAC layer of the eNB 200 includes a scheduler (MAC scheduler). The scheduler determines transport formats (transport block size, modulation and coding scheme (MCS)) of uplink and downlink and allocated resource blocks to UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various configurations is transmitted between the RRC layer of the UE 100 and the RRC layer of the eNB 200. The RRC layer controls logical channels, transport channels, and physical channels in response to establishment, re-establishment and release of radio bearers. If there is an RRC connection between the RRC of the UE 100 and the RRC of the eNB 200, the UE 100 is in the RRC connected state. If there is no RRC connection between the RRC of the UE 100 and the RRC of the eNB 200, the UE 100 is in the RRC idle state.

The NAS (Non-Access Stratum) layer located above the RRC layer performs, for example, session management and mobility management.

Figure 3:
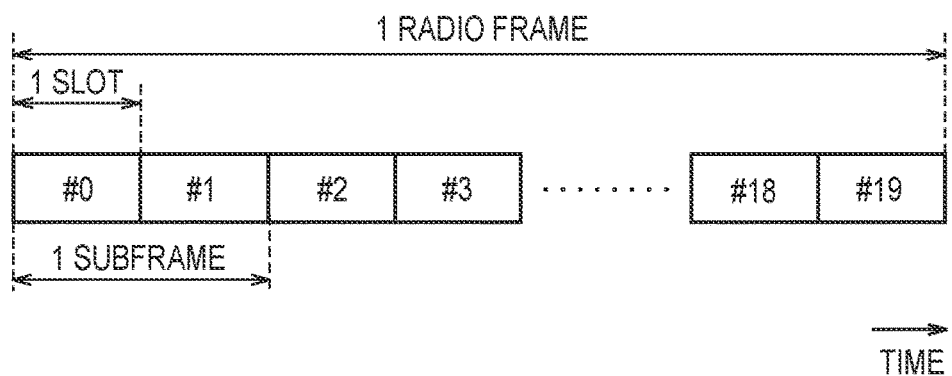
FIG. 3 is a configuration diagram of a radio frame used in the LTE system.

FIG. 3 is a diagram illustrating a configuration of a radio frame of the LTE system. In the LTE system, OFDMA (Orthogonal Frequency Division Multiple Access) is applied to the downlink. SC-FDMA (Single Carrier Frequency Division Multiple Access) is applied to the uplink.

As shown in FIG. 3, the radio frame is composed of ten subframes arranged in the time direction. Each subframe is composed of two slots aligned in the time direction. The length of each subframe is 1 ms. The length of each slot is 0.5 ms. Each subframe includes a plurality of resource blocks (RBs) in the frequency direction. Each subframe includes a plurality of symbols in the time direction. Each resource block includes a plurality of subcarriers in the frequency direction. One resource element (RE: Resource Element) is composed of one symbol and one subcarrier. A radio resource (time/frequency resource) is allocated to the UE 100. In the frequency direction, radio resources (frequency resources) are configured by resource blocks. In the time direction, radio resources (time resources) are configured by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are portions usable as a Physical Uplink Control Channel (PUCCH) for transmitting an uplink control signal. The remaining part of each subframe is an area that can be used as a physical uplink shared channel (PUSCH) for transmitting uplink data.

(Proximity-Based Services)

Proximity-based services (ProSes) will be described. The proximity-based service is a service that can be provided by a 3GPP system, based on communication devices (for example, UEs 100) in the vicinity of each other.

In the ProSe, various types of radio signals are directly transmitted and received via a direct radio link between nodes (for example, between UEs), without passing through a network (for example, the eNB 200). The direct radio link in the ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface. The PC5 is a reference point between ProSe-enabled UEs used for a control plane and a user plane for the ProSe direct discovery, the ProSe direct communication, and a ProSe UE-Network relay.

Defined modes of the ProSe include "Direct discovery", "Direct communication", and "Relay" modes. "Relay" will be described later.

The direct discovery may be, for example, a mode of searching for a destination by directly transmitting, between UEs, a discovery message (discovery signal) that does not specify a specific destination. The direct discovery may be a procedure for discovering another UE in the vicinity of a UE by using a direct radio signal in E-UTRA (Evolved Universal Terrestrial Radio Access) via the PC5. The direct discovery may be a procedure to be adopted by a UE 100 capable of executing the proximity-based service for discovering another UE 100 capable of executing the proximity-based service by using only a capability of the two UEs 100 with the help of the E-UTRA technology. The direct discovery may be supported only if the service is provided to the UE 100 by the E-UTRAN (eNB 200 (cell)). The service may be provided by the E-UTRAN if the UE 100 is either connected to the cell (eNB 200) or exits in the cell.

A resource allocation type for the transmission (announcement) of the discovery message (discovery signal) includes "Type 1" and "Type 2 (Type 2B)". In the "Type 1", the UE 100 selects a radio resource. In the "Type 2 (Type 2B)", the eNB 200 allocates a radio resource. In the Type 1, the UE 100 may select the radio resource from a resource pool provided by the eNB 200.

A "Sidelink Direct Discovery" protocol stack includes a physical (PHY) layer, a MAC layer, and a ProSe protocol.

The direct communication may be, for example, a mode in which data is directly transmitted between UEs by specifying a specific destination (destination group). The direct communication may be communication between two or more UEs capable of executing the proximity-based services through user plane transmission in which the E-UTRA technology is employed via a path without passing through any network node.

The resource allocation types of the direct communication include "Mode 1" and "Mode 2". In the "Mode 1", the eNB 200 specifies a radio resource of the direct communication. In the "Mode 2", the UE 100 selects a radio resource of the direct communication. In the Mode 2, the UE 100 may select the radio resource from a resource pool provided by the eNB 200.

A protocol stack of the user plane in the sidelink communication (direct communication) in the PC5 includes a physical (PHY) layer, a MAC layer, an RLC layer, and a PDCP layer. A protocol stack of a control plane for a sidelink broadcast control channel (SBCCH) in the PC5 includes a physical (PHY) layer, a MAC layer, an RLC layer, and an RRC layer. A protocol stack of the control plane for one-to-one sidelink communication includes a physical (PHY) layer, a MAC layer, an RLC layer, a PDCP layer, and a PC5 signaling protocol.

In the sidelink, various types of information are transmitted by using the following channels.

Physical channels for the sidelink include Physical Sidelink Broadcast Channel (PSBCH), Physical Sidelink Discovery Channel (PSDCH), Physical Sidelink Control Channel (PSCCH), and Physical Sidelink Shared Channel (PSSCH).

The PSBCH is a channel for transmitting information related to a system and synchronization (for example, synchronization signal). The PSDCH is a channel for transmitting a sidelink discovery message (discovery signal) from a UE. The PSCCH is a channel for transmitting control information from a UE for sidelink communication. The PSSCH is a channel for transmitting data from a UE for sidelink communication.

Transport channels for the sidelink include Sidelink Broadcast Channel (SL-BCH), Sidelink Discovery Channel (SL-DCH), and Sidelink Shared Channel (SL-SCH). The SL-BCH is mapped to the PSBCH. The SL-DCH is mapped to the PSDCH. The SL-SCH is mapped to the PSSCH.

Logical channels (control channel, traffic channel) for the sidelink include Sidelink Broadcast Control Channel (SBCCH) and Sidelink Traffic Channel (STCH).

The SBCCH is a sidelink channel for broadcasting sidelink system information from one UE to another UE or other UEs. The STCH is a point-to-multipoint channel for transferring user information (data) from one UE to another UE or other UEs. The STCH is used only in UEs capable of sidelink communication. The STCH may be used for point-to-point communication between two UEs capable of sidelink communication. The STCH is mapped to the SL-SCH. The SBCCH is mapped to the SL-BCH.

(Zone Concept)

Figure 4:
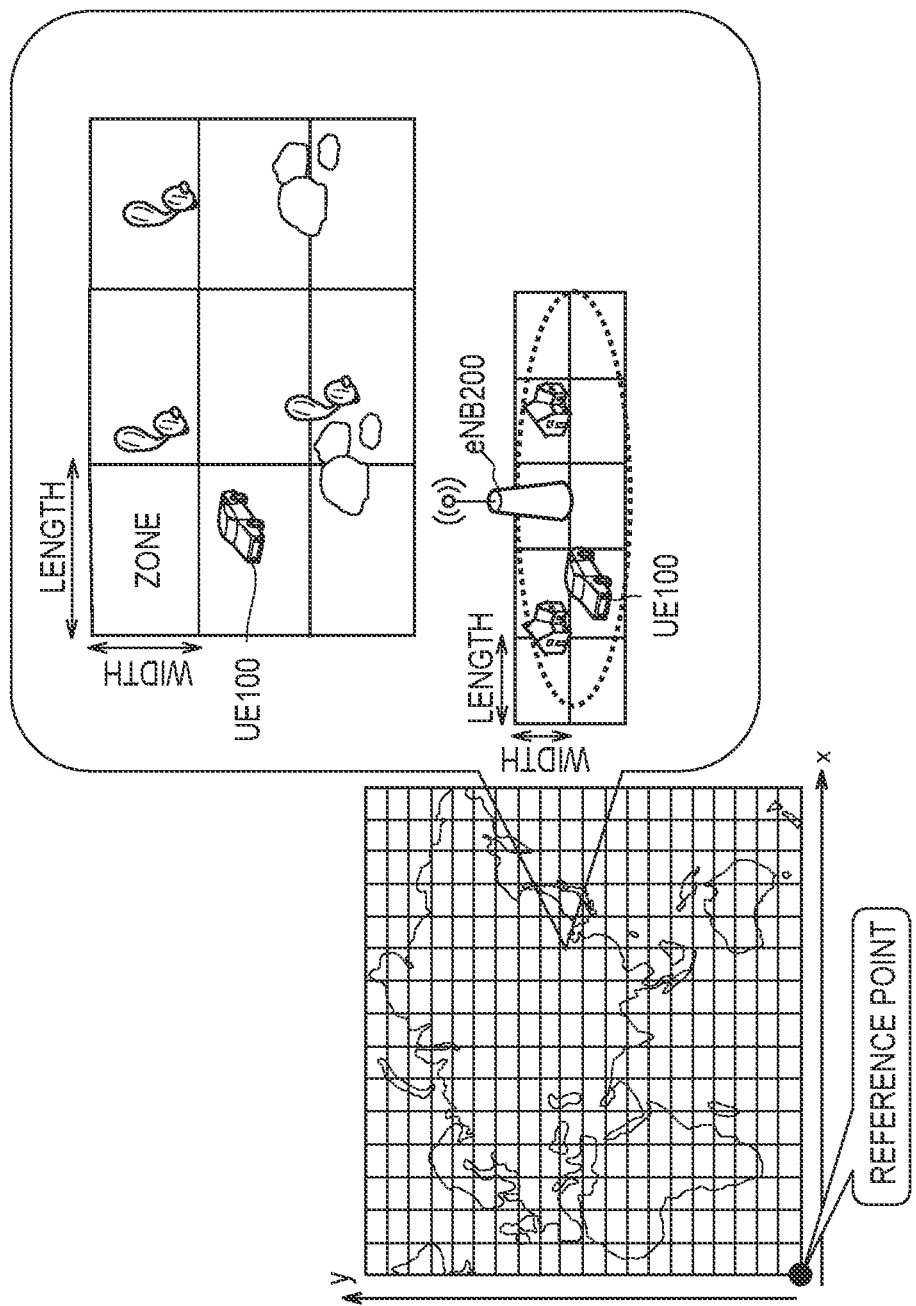
FIG. 4 is a diagram for describing an example of a zone.

A zone concept will be described with reference to FIG. 4. FIG. 4 is a diagram for describing an example of a zone.

In the zone concept, the world is divided into geographical zones, as illustrated in FIG. 4. A UE 100 that is in coverage receives information (zone definition information) for defining a zone (zone identification information) from the eNB 200. Pre-configured information (zone definition information) is applied to a UE 100 that is out-of-coverage. The zone definition information defines, for example, a length of the zone, a width of the zone, and a single fixed reference point.

The UE 100 determines the zone in which the UE 100 is located based on the zone definition information. That is, the UE 100 determines in which zone the UE 100 is located. The UE 100 can determine the zone by a modulo operation. The UE 100 can determine the zone by using a reference point (for example, (0, 0)).

The zone is different from a coverage of the cell. The cell corresponds to a reachable range of a radio signal of the eNB 200. The zone is, for example, a geographical section determined (defined) by a network (eNB 200 or the like).

(Radio Terminal)

Figure 5:
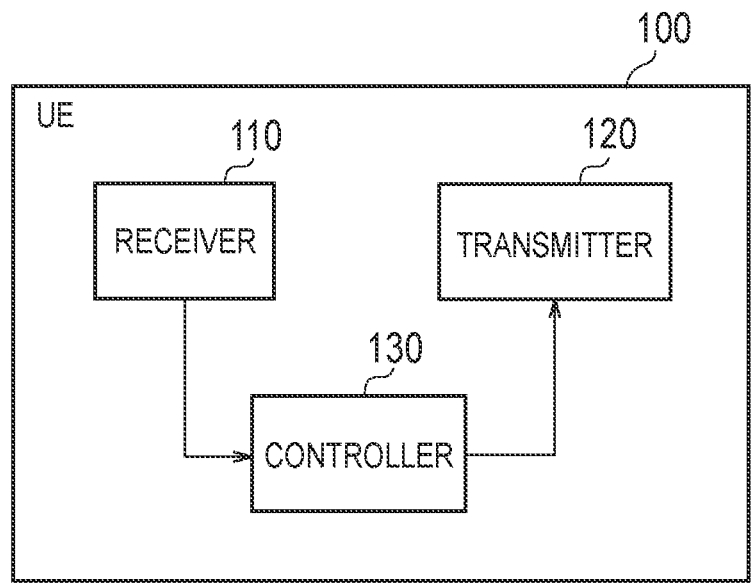
FIG. 5 is a block diagram of a UE 100.

The UE 100 (radio terminal) according to embodiment will be described. FIG. 5 is a block diagram of the UE 100. As shown in FIG. 5, the UE 100 includes a receiver 110, a transmitter 120, and a controller 130. The receiver 110 and the transmitter 120 may be integrated transceivers.

The receiver 110 performs various types of reception under the control of the controller 130. Receiver 110 includes antennas. The receiver 110 converts a radio signal received by the antennas into a baseband signal (received signal). The receiver 110 outputs a baseband signal to the controller 130.

The transmitter 120 performs various transmissions under the control of the controller 130. The transmitter 120 includes antennas. The transmitter 120 converts a baseband signal (transmission signal) output from the controller 130 into a radio signal. The transmitter 120 transmits a radio signal from the antennas.

The controller 130 performs various controls in the UE 100. The controller 130 includes a processor and a memory. The memory stores programs executed by the processor and information used for processing by the processor. The processor includes a baseband processor and a CPU (Central Processing Unit). The baseband processor performs, for example, modulation/demodulation and encoding/decoding of a baseband signal. The CPU executes various processes by executing a program stored in the memory. The processor may include a codec for encoding/decoding audio/video signals. The processor executes various processes to be described later and the above-described various communication protocols.

The UE 100 may include a Global Navigation Satellite System (GNSS) receiver. The GNSS receiver can receive a GNSS signal to obtain location information indicating a geographical location of the UE 100. The GNSS receiver outputs the GNSS signal to the controller 130. The UE 100 may have a GPS (Global Positioning System) function for acquiring the position information of the UE 100. The UE 100 may have a function of position predicting such as an electronic compass, an acceleration sensor, and the like. The location information may be geo-location information.

The UE 100 is a communication apparatus having a function capable of executing transmission and/or reception of direct signaling with another communication apparatus. Therefore, it goes without saying that the UE 100 may have other configurations (for example, functions, members, etc.).

In the present specification, processes performed by at least one of the receiver 110, the transmitter 120, and the controller 130 of the UE 100 will be described as processes (operations) executed by the UE 100 for the sake of convenience.

(Base Station)

Figure 6:
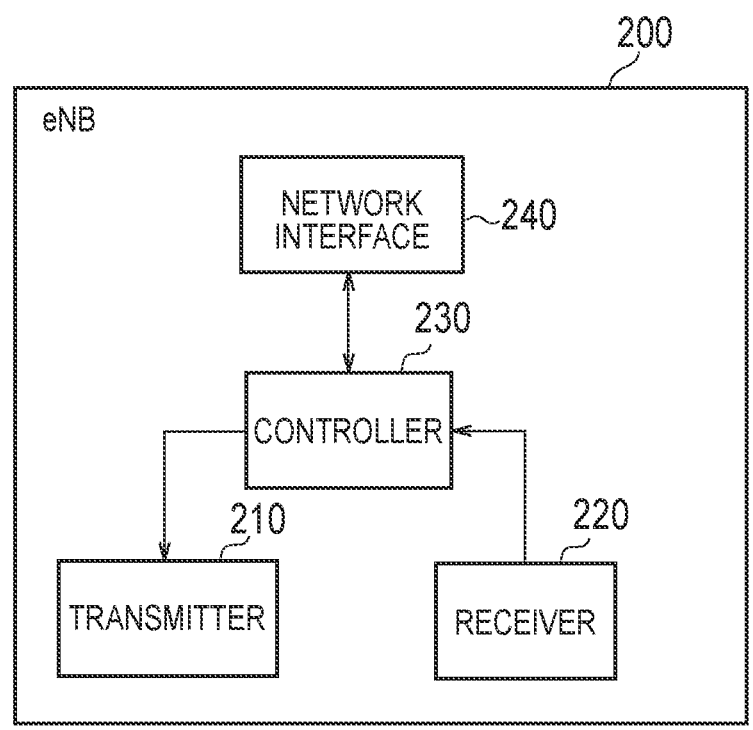
FIG. 6 is a block diagram of an eNB 200.

The eNB 200 (base station) according to each embodiment will be described. FIG. 6 is a block diagram of the eNB 200. As shown in FIG. 6, the eNB 200 includes a receiver 210, a transmitter 220, a controller 230, and a network interface 240. The receiver 210 and the transmitter 220 may be an integrated transceiver.

The receiver 210 performs various types of reception under the control of the controller 230. Receiver 210 includes antennas. The receiver 210 converts a radio signal received by the antennas into a baseband signal (received signal). The receiver 210 outputs a baseband signal to the controller 230.

The transmitter 220 performs various transmissions under the control of the controller 230. The transmitter 220 includes antennas. The transmitter 220 converts the baseband signal (transmission signal) output from the controller 230 into a radio signal. The transmitter 220 transmits a radio signal from antennas.

The controller 230 performs various controls in the eNB 200. The controller 230 includes a processor and a memory. The memory stores programs executed by the processor and information used for processing by the processor. The processor includes a baseband processor and a CPU. The baseband processor performs modulation/demodulation, encoding/decoding, etc. of the baseband signal, for example. The CPU executes various processes by executing a program stored in the memory. The processor executes various processes to be described later and the above-described various communication protocols.

The network interface 240 is connected to the neighboring eNB 200 via the X2 interface. The network interface 240 is connected to the MME 300 and the SGW 400 via the S1 interface. For example, the network interface 240 is used for communication performed on the X2 interface and communication performed on the S1 interface.

In the present specification, processing performed by at least one of the receiver 210, the transmitter 220, the controller 230, and the network interface 240 of the eNB 200 will be described as a process (operation) executed by the eNB 200 for convenience.

Operation According to Embodiment

An operation according to the embodiment will be described with reference to the following operation patterns 1 to 4.

(A) Operation Pattern 1

Figure 7:
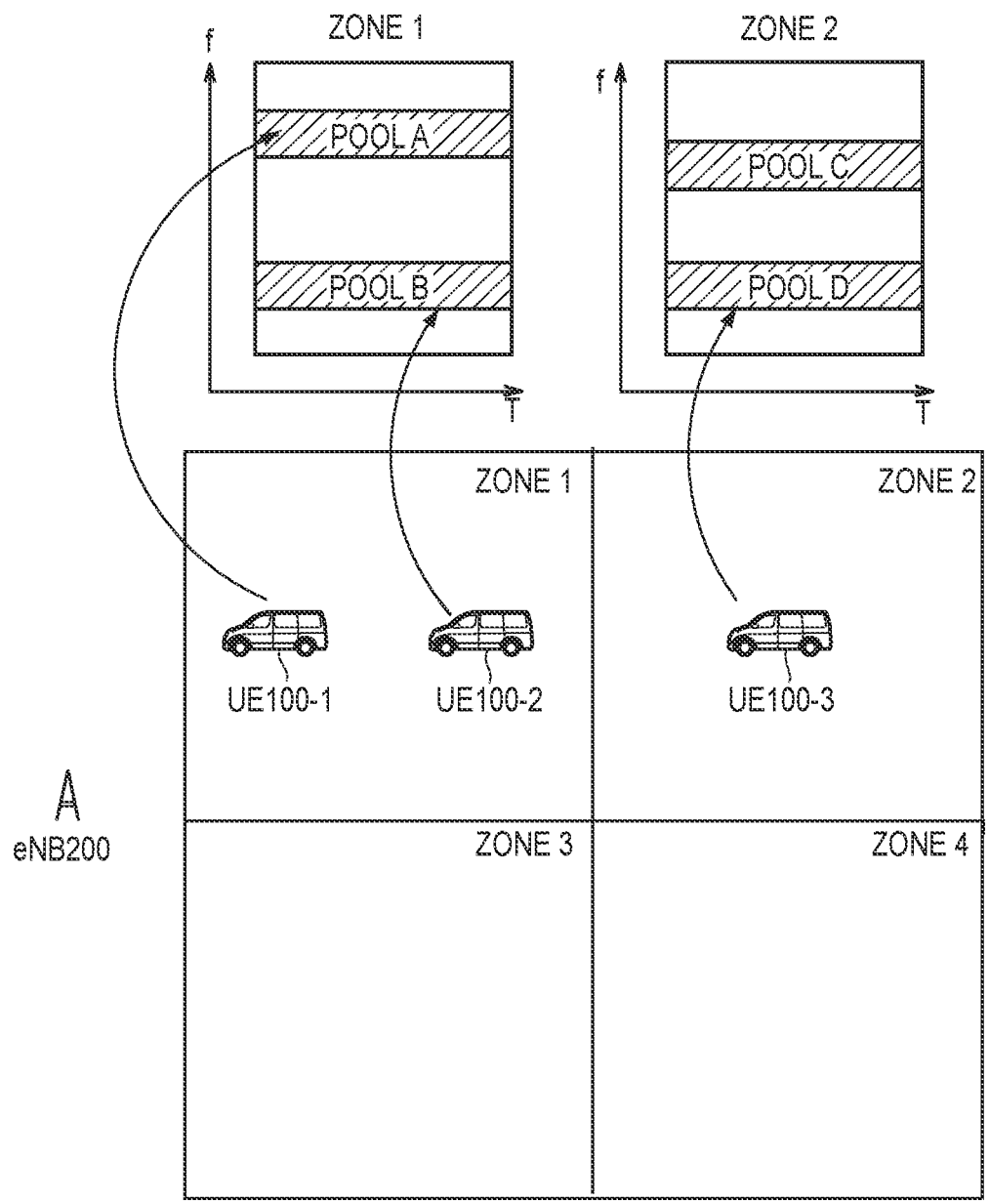
FIG. 7 is a diagram for describing an operation environment of an operation pattern 1.
Figure 8:
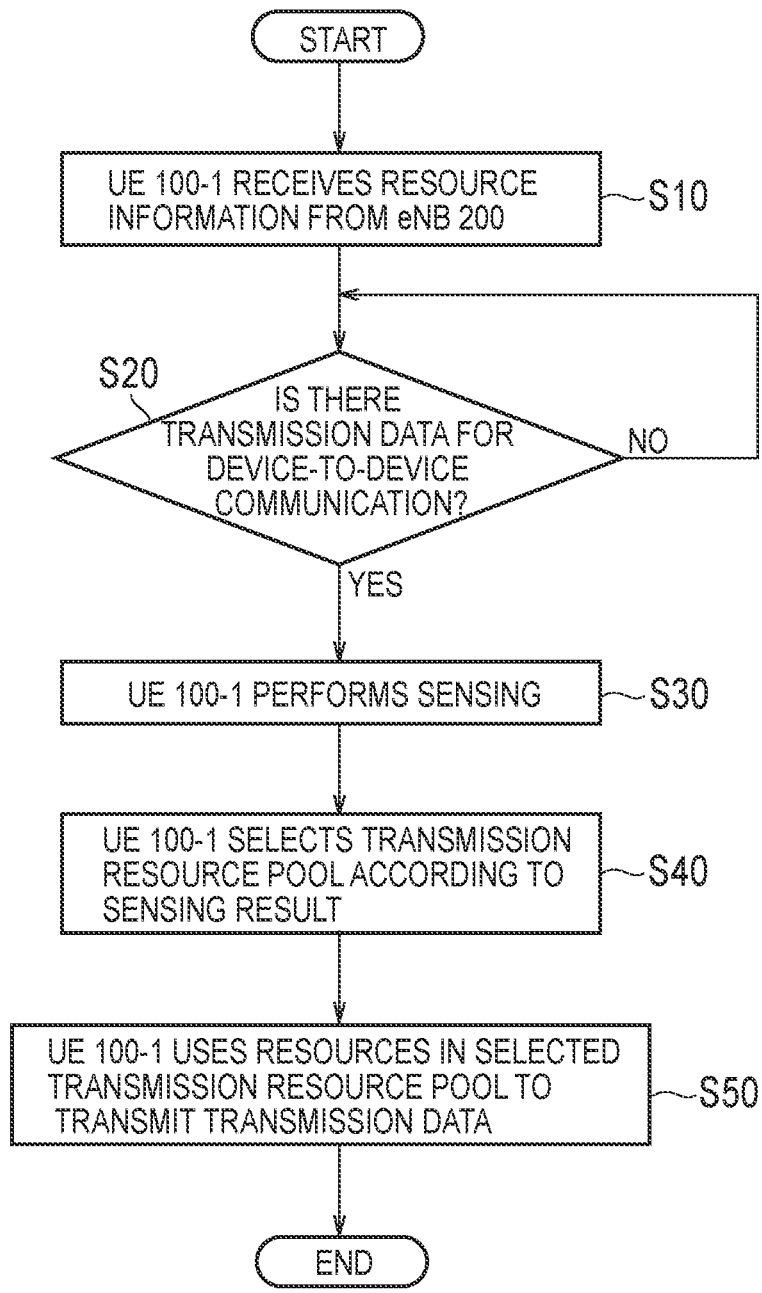
FIG. 8 is a flowchart for describing the operation pattern 1.

The operation pattern 1 will be described with reference to FIG. 7 and FIG. 8. FIG. 7 is a diagram for describing an operation environment of the operation pattern 1. FIG. 8 is a flowchart for describing the operation pattern 1.

As illustrated in FIG. 7, each UE 100 (a UE 100-1 to a UE 100-3) is located (exists) in a cell managed by the eNB 200. The UE 100-1 and the UE 100-2 are located in a Zone 1 that is a geographical area. The UE 100-3 is located in Zone 2.

Based on configuration information (zone definition information), the UE 100-1 identifies a zone that is a geographical section where the UE 100-1 is located. The UE 100-1 can identify the zone based on the zone definition information and location information of the UE 100-1. Another UE 100 can also identify a zone where the other UE is located. Each UE 100 may identify a zone, for example, when transmitting and/or receiving a direct radio signal between devices (for example, performing V2X communication).

Each UE 100 may have established an RRC connection with the eNB 200 (cell) (may be in an RRC connected state). Each UE 100 may not have established the RRC connection (may be in an RRC idle state). Each UE 100 may establish an RRC connection with the eNB 200 when transmitting a radio signal to the eNB 200.

An operation of the UE 100-1 will be mainly described below. The UE 100-2 and the UE 100-3 can execute a similar operation to the UE 100-1.

As illustrated in FIG. 8, in step S10, the UE 100-1 may receive resource information from the eNB 200.

The eNB 200 may transmit the resource information to the UE 100-1 by dedicated signaling (such as an RRC reconfiguration message and DCI (Downlink Control Information) or the like) and/or broadcast signaling (such as SIB: System Information Block (SIB 21 or the like)). The resource information may be pre-configured to the UE 100-1. The resource information may be stored (configured) in the SIM (Subscriber Identity Module Card) of the UE 100-1. The SIM may be a UIM (User Identity Module Card) or a USIM (Universal Subscriber Identity Module Card).

The resource information includes information of a transmission resource pool (transmission resource region) used for transmission (and reception) of a direct radio signal between devices. Here, the resource information may indicate that one zone is associated (that is, related) with a plurality of transmission resource pools. For example, the zone identification information is associated with information indicating the plurality of transmission resource pools. The plurality of transmission resource pools may be resource pools different from each other.

In the operation pattern 1, a pool A and a pool B that are transmission resource pools, are associated with the Zone 1. A pool C and a pool D are associated with the Zone 2.

The zone identification information may be an identifier (Zone ID) indicating a predetermined zone (such as the Zone 1). The zone identification information may be information (an expression, a parameter, and the like) for identifying (calculating) a predetermined zone.

In step S20, the UE 100-1 determines whether there is transmission data for direct device-to-device communication (such as V2X communication and V2V communication). If there is transmission data, the UE 100-1 executes a process of step S30 (Yes). If there is no transmission data, the UE 100-1 may repeat the process of step S20. The UE 100-1 may terminate the process.

In step S30, the UE 100-1 performs measurement (sensing) of the radio signal. Specifically, the UE 100-1 performs sensing for at least one of the transmission resource pools (the pool A and the pool B) associated with the zone (that is, the identified zone) in which the UE 100-1 is located. The UE 100-1 may perform sensing for at least one of a control region and a data region in the transmission resource pool. The control region is a region (for example, the PSCCH) in which control information used for device-to-device communication is placed. The control information includes information indicating a location where data information is placed. The data region is a region (for example, the PSSCH) in which data information used for device-to-device communication is placed.

Sensing may be performed only in a specific transmission resource pool. In the configuration (configuration information) of the transmission resource pool, if sensing is instructed, if there is no instruction that sensing may not be performed, if the configuration is assigned to a specific purpose (for example, V2V communication), or if the configuration is given by a specific message (for example, an SIB 21 which is an SIB for V2V communication), the UE 100 can determine that the transmission resource pool configured by the configuration is the specific transmission resource pool.

The UE 100-1 measures, for example, a reception level (reception strength (RSRP: Reference Signal Received Power) and a reception quality (RSRQ: Reference Signal Received Quality), and the like) of a radio signal in the transmission resource pool.

In step S40, the UE 100-1 selects the transmission resource pool based on a sensing result (measurement result). For example, the UE 100-1 may select an unused pool among the pool A and the pool B. That is, the UE 100-1 may select, from the plurality of pools, the pool having the lowest congestion degree (interference). For example, the UE 100-1 determines that the congestion degree is larger, as the reception strength of the radio signal is stronger. The UE 100-1 determines that the congestion degree is smaller, as the reception strength of the radio signal is lower. The UE 100-1 determines that the congestion degree is larger, as the reception quality of the radio signal is lower. The UE 100-1 determines that the congestion degree is smaller, as the reception quality of the radio signal is higher.

As described above, the UE 100-1 can reduce the collision between radio signals in device-to-device communication by selecting a pool with a low congestion degree (interference).

The UE 100-1 may execute the process of step S20 after executing the processes of step S30 and step S40. The UE 100 may select a transmission resource pool, even if there is no transmission data, for example. As a result, the UE 100 can transmit transmission data without delay if the transmission data is generated.

The UE 100-1 may select the transmission resource pool based on predetermined information used for selecting the transmission resource pool. The predetermined information is at least one of, for example, a threshold value to be compared with the sensing result (measurement result), a priority of the transmission data, and a measurement condition of the radio signal. The predetermined information may be associated with each transmission resource pool. For example, the pool A may be associated with a threshold value A, and the pool B may be associated with a threshold value B.

The UE 100-1 may select the transmission resource pool based on the threshold value to be compared with the sensing result (measurement result). For example, the UE 100-1 may compare the threshold value with the congestion degree. The UE 100-1 may select a pool having a congestion degree lower than the threshold value as the transmission resource pool. If there are a plurality of pools having a congestion degree lower than the threshold value, the UE 100-1 may select one pool from the plurality of pools. The UE 100-1 may randomly select one pool from the plurality of pools.

The UE 100-1 may select the transmission resource pool based on the priority of the transmission data. For example, the UE 100-1 may select the transmission resource pool corresponding to the priority of the transmission data. If the priority of the transmission data is high (priority A), the UE 100-1 may select a pool associated (related) with a high priority (pool with priority A). If the priority of the transmission data is high (priority A), the UE 100-1 may select the pool associated (related) with the high priority (pool with priority A).

The threshold value may be set based on the priority of the transmission resource pool. For example, if the priority of the pool is high, the threshold value may be set to a value that the UE 100 can not easily select. If the priority of the pool is low, the threshold value may be set to a value that the UE 100 can easily select. As a result, the number of UEs that can select a transmission resource pool with high priority is smaller than the number of UEs that can select a transmission resource pool with low priority. As a result, it is possible to reduce the number of collisions between radio signals in the transmission resource pool with high priority.

The priority of the transmission data may be based on types of the data. The types of data include transmission data for emergency, transmission data for safety, transmission data for driving support, and transmission data of road information. The priority of the transmission data may be a priority for each packet. For example, the priority may be PPPP (ProSe Per-Packet Priority).

The UE 100-1 may select the transmission resource pool based on the measurement condition of the radio signal. For example, the measurement condition of the radio signal may be a measurement time.

For example, the pool A may be associated with a measurement time t1 and the pool B may be associated with a measurement time t2. The UE 100-1 may perform sensing in the pool A during the measurement time t1 and may perform sensing in the pool B during the measurement time t2.

The UE 100-1 may select the transmission resource pool based on an identifier associated with the UE 100-1 and/or the transmission data. For example, the UE 100-1 may select the transmission resource pool with an ID (pool ID) calculated by the expression "identifier mod M".

The identifier may be an identifier (such as a UE ID and a C-RNTI (Cell-Radio Network Temporary Identifier)) of the UE 100-1 which performed transmission. The identifier may be an identifier of a UE to which transmission was performed. The identifier may be an identifier (such as ProSe ID and V2V ID) assigned to the UE 100-1 for device-to-device communication. The identifier may be an identifier of an application corresponding to the transmission data. M is the number of transmission resource pools associated with the zone of the UE 100-1. The transmission resource pool is associated with the pool ID.

If the transmission resource pool is not associated with a priority, for example, the UE 100-1 may select the transmission resource pool based on the above expression. If there are a plurality of transmission resource pools having the same priority, the UE 100-1 may select the transmission resource pool based on the above expression.

The UE 100-1 may use the above expression to select the transmission resource pool for which to perform sensing. Therefore, the UE 100-1 may use the above expression to reduce the number of transmission resource pools for which to perform sensing. For example, the UE 100-1 may use the above expression to select two transmission resource pools from the five transmission resource pools. The UE 100-1 may perform sensing for the selected transmission resource pool. As a result, a load of the UE 100 (a load due to the sensing process) can be reduced.

In step S50, the UE 100-1 uses resources in the selected transmission resource pool to directly transmit the transmission data. That is, the UE 100-1 transmits a direct radio signal to another UE.

For example, the UE 100-1 may select the pool A from among the pool A and the pool B. The UE 100-1 may select control resources and data resources in the pool A. The UE 100-1 uses the selected control resources to transmit control information through device-to-device communication. The control information includes information indicating a location of the data resources. Afterwards, the UE 100-1 uses the selected data resources to transmit the transmission data through device-to-device communication.

The UE 100-2 executes a similar operation to the UE 100-1. Based on the sensing result, the UE 100-2 may select the pool B instead of the pool A used by the UE 100-1.

On the other hand, the UE 100-3 is located in a different zone from the UE 100-1 and the UE 100-2, and thus, the UE 100-3 selects, from the plurality of transmission resource pools (the pool C and the pool D) associated with the Zone 2, a transmission resource pool (for example, the pool D) to be used. The plurality of transmission resource pools associated with the Zone 1 and the plurality of transmission resource pools associated with the Zone 2 may be different from each other.

As described above, a plurality of transmission resource pools are associated with one zone, and thus, the collision between radio signals can be reduced in device-to-device communication.

(B) Operation Pattern 2

Figure 9:
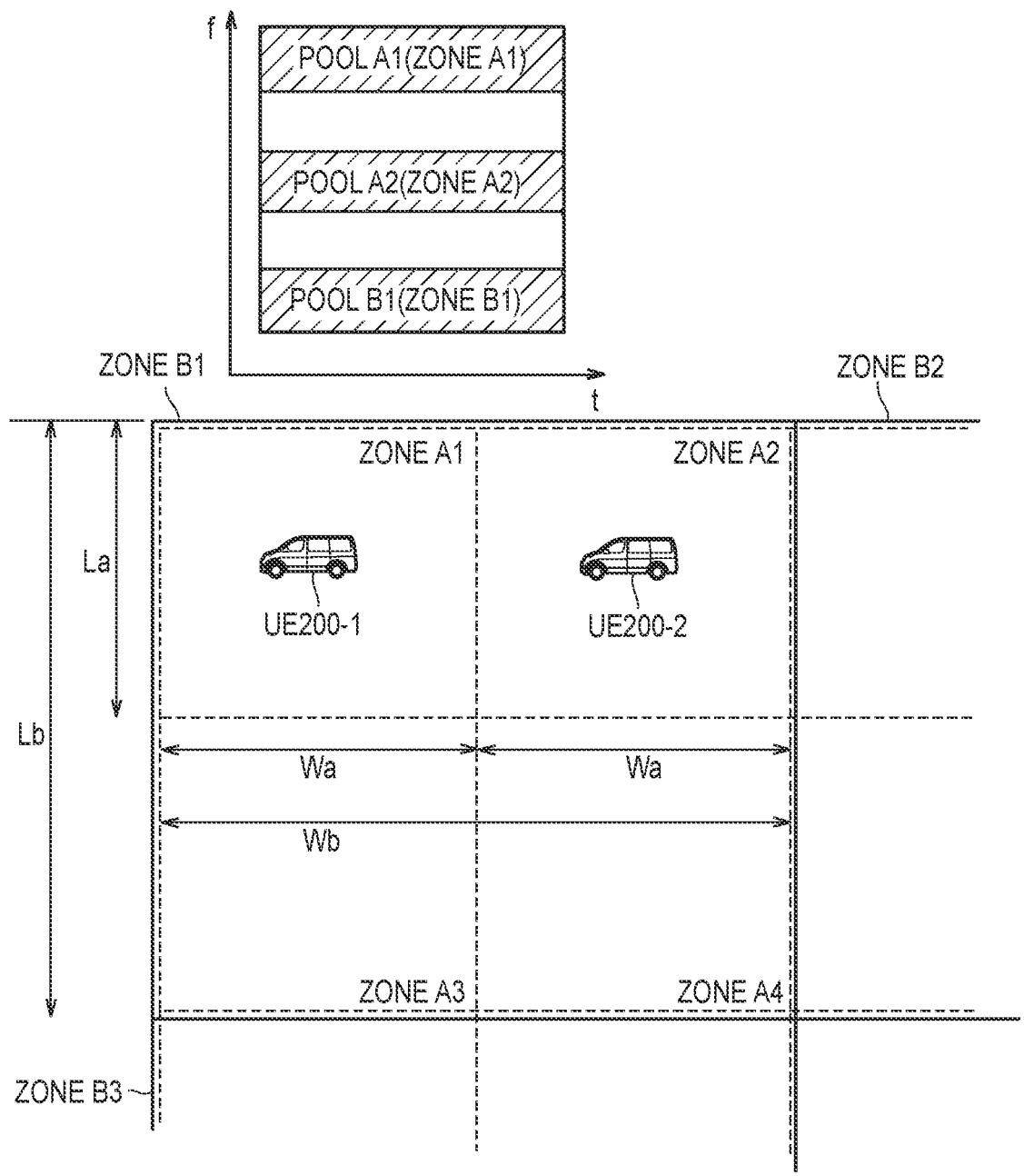
FIG. 9 is a diagram for describing an operation pattern 2.
Figure 10:
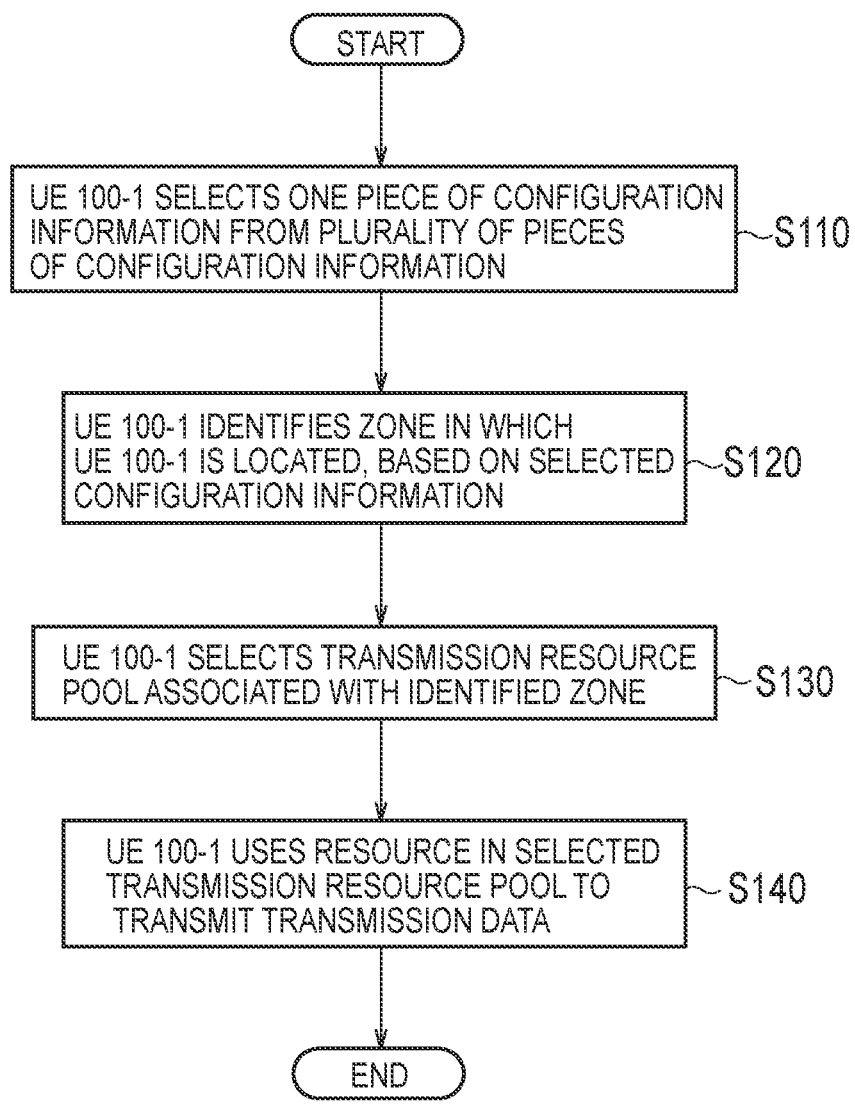
FIG. 10 is a flowchart for describing the operation pattern 2.

The operation pattern 2 will be described with reference to FIG. 9 and FIG. 10. FIG. 9 is a diagram for describing the operation pattern 2. FIG. 10 is a flowchart for describing the operation pattern 2. The description of content similar to the content described above will be omitted.

In the operation pattern 2, the UE 100-1 selects (applies), according to a state of the UE 100-1, a piece of configuration information from a plurality of pieces of configuration information for calculating a zone. An operation environment of the operation pattern 2 is similar to that of the operation pattern 1.

The UE 100-1 holds a plurality of pieces of configuration information. The UE 100-1 may receive, from the eNB 200, at least one piece of configuration information from the plurality of pieces of configuration information. The UE 100-1 may be pre-configured with at least one piece of configuration information from the plurality of pieces of configuration information.

The configuration information is information for calculating a zone. That is, the configuration information may include zone definition information for defining a zone. The configuration information may include the resource information described above.

The configuration information (zone definition information) includes information (a parameter and/or an expression) used for calculating (defining) a zone. The parameters (and/or the expressions) included in each of the plurality of pieces of configuration information may be different from each other. For example, the parameters may be at least one of the length of the zone, the width of the zone, the number of zones, and/or the size of the smallest zone.

As illustrated in FIG. 9 and FIG. 10, in step S110, the UE 100-1 selects configuration information from the plurality of pieces of configuration information. For example, the UE 100-1 may select configuration information according to a transmission state of the UE 100-1 (the priority of the transmission data). For example, if the UE 100-1 is in a transmission state where the UE 100-1 transmits transmission data with high priority, the UE 100-1 may select configuration information for which the zone is calculated to be small. If the UE 100-1 is in a transmission state where the UE 100-1 transmits transmission data with low priority, the UE 100-1 may select configuration information for which the zone is calculated to be large.

The zone and the transmission resource pool are associated with each other, and thus, the UE 100-1 can reduce the collision probability by selecting configuration information for which the zone is calculated to be small. It is also possible to suppress degradation of the reception quality from "in-band emission". Therefore, if transmitting transmission data with high priority, the UE 100-1 may select the configuration information for which the zone is calculated to be small. The UE 100-1 can reduce the occurrence of frequent switching of zones by selecting configuration information for which the zone is calculated to be large. Therefore, if transmitting transmission data with low priority, the UE 100-1 may select configuration information for which the zone is calculated to be large.

The UE 100-1 may select configuration information according to a movement state (movement speed) of the UE 100-1. For example, if the UE 100-1 is in a state where the UE 100-1 is moving at low speed, the UE 100-1 may select configuration information for which the zone is calculated to be small. If the UE 100-1 is in a transmission state where the UE 100-1 is moving at high speed, the UE 100-1 may select configuration information for which the zone is calculated to be large. The UE 100-1 may receive, from the eNB 200, a threshold value used in a determination (that is, a threshold value (maximum threshold value and/or minimum threshold value) to be compared with the movement speed). The threshold value may indicate a range (range class). The threshold value may be associated with each piece of configuration information.

The UE 100-1 may select configuration information according to a transmission state of the UE 100-1 (transmission power of the direct radio signal). For example, if the UE 100-1 is in a state where the transmission power is low, the UE 100-1 may select configuration information for which the zone is calculated to be small. If the UE 100-1 is in a transmission state where the transmission power is large, the UE 100-1 may select configuration information for which the zone is calculated to be large. The UE 100-1 may receive, from the eNB 200, a threshold value used in a determination (that is, a threshold value (maximum threshold value and/or minimum threshold value) to be compared with the transmission power). The threshold value may indicate a range (range class). The threshold value may be associated with each piece of configuration information.

If executing an operation with power-saving, the UE 100-1 may select configuration information for which the zone is calculated to be small. If executing a normal operation (not executing the operation with power-saving), the UE 100-1 may select configuration information for which the zone is calculated to be large. The UE 100-1 may select configuration information according to the maximum transmission power allowed for device-to-device communication.

In step S120, the UE 100-1 identifies the zone in which the UE 100-1 is located based on the selected configuration information. For example, configuration information (hereinafter, first configuration information) for which the zone is calculated to be small may include a parameter in which the length of the zone is La and the width of the zone is Wa. Configuration information (hereinafter, second configuration information) for which the zone is calculated to be large may include a parameter in which the length of the zone is Lb and the width of the zone is Wb.

If identifying (calculating) a zone based on the first configuration information, the UE 100-1 identifies a Zone A1 as the zone in which the UE 100-1 is located. If identifying (calculating) a zone based on the first configuration information, the UE 100-2 identifies a Zone A2 as the zone in which the UE 100-2 is located. Therefore, the UE 100-2 is located in a different zone from the UE 100-1.

If identifying (calculating) a zone based on the second configuration information, the UE 100-1 identifies a Zone B1 as the zone in which the UE 100-1 is located. If identifying (calculating) a zone based on the second configuration information, the UE 100-2 identifies the Zone B1 as the zone in which the UE 100-2 is located. Therefore, the UE 100-2 is located in the same zone as the UE 100-1.

Due to one of the length L of the zone and the width W of the zone being different, the calculated zone may be different. Due to a difference in the number N of zones, the calculated zones may be different. For example, if the number of zones in a length direction of the zones is Nl and the number of zones in a width direction of the zones is Nw, the length L of the zone may be calculated based on the number Nl of zones, and the width W of the zone may be calculated based on the number Nw of zones. The number N of zones may be a repetition period of a zone identifier (Zone ID). Therefore, due to the difference in the number N of zones, a zone identifier to be assigned (that is, the zone identifier specified by the UE 100) may change, even for zones in the same location.

The UE 100-1 may identify the zone based on a size of the smallest zone (Lmin, Wmin). For example, based on the first configuration information, the UE 100-1 may calculate each zone (Zone A1, Zone A2, . . . ) to be equal to a size of the smallest zone. Based on the second configuration information, the UE 100-1 may calculate each zone (Zone B1, Zone B2, . . . ) to be equal to a size M times (for example, four times) the size of the smallest zone. Each piece of configuration information may include a parameter indicating at least one of the size of the smallest zone (Lmin, Wmin), a size (L, M) of zones included in a zone group of one block, and the number (N/multiple) of the smallest zones included in the zone group, for example.

In step S130, the UE 100-1 selects a transmission resource pool associated with the identified zone. If identifying the Zone A1 based on the first configuration information, the UE 100-1 selects a pool A1 associated with the Zone A1. If identifying the Zone A2 based on the first configuration information, the UE 100-2 selects a pool A2 associated with the Zone A2. That is, the UE 100-2 selects a transmission resource pool different from the UE 100-1.

If identifying the Zone B1 based on the second configuration information, the UE 100-1 selects a pool B1 associated with the Zone B1. If identifying the Zone B1 based on the second configuration information, the UE 100-2 selects the pool B1 associated with the Zone B1. That is, the UE 100-2 selects the same transmission resource pool as the UE 100-1.

Similarly to the operation pattern 1, each zone may be associated with a plurality of transmission resource pools. Each UE 100 may select one transmission resource pool from the plurality of transmission resource pools.

Step S140 corresponds to step S50.

As described above, the UE 100-1 can select the configuration information, according to a state of the UE 100-1, from the plurality of pieces of configuration information for calculating a zone. As a result, the UE 100-1 can appropriately calculate the zone according to the state.

(C) Operation Pattern 3

Figure 11:
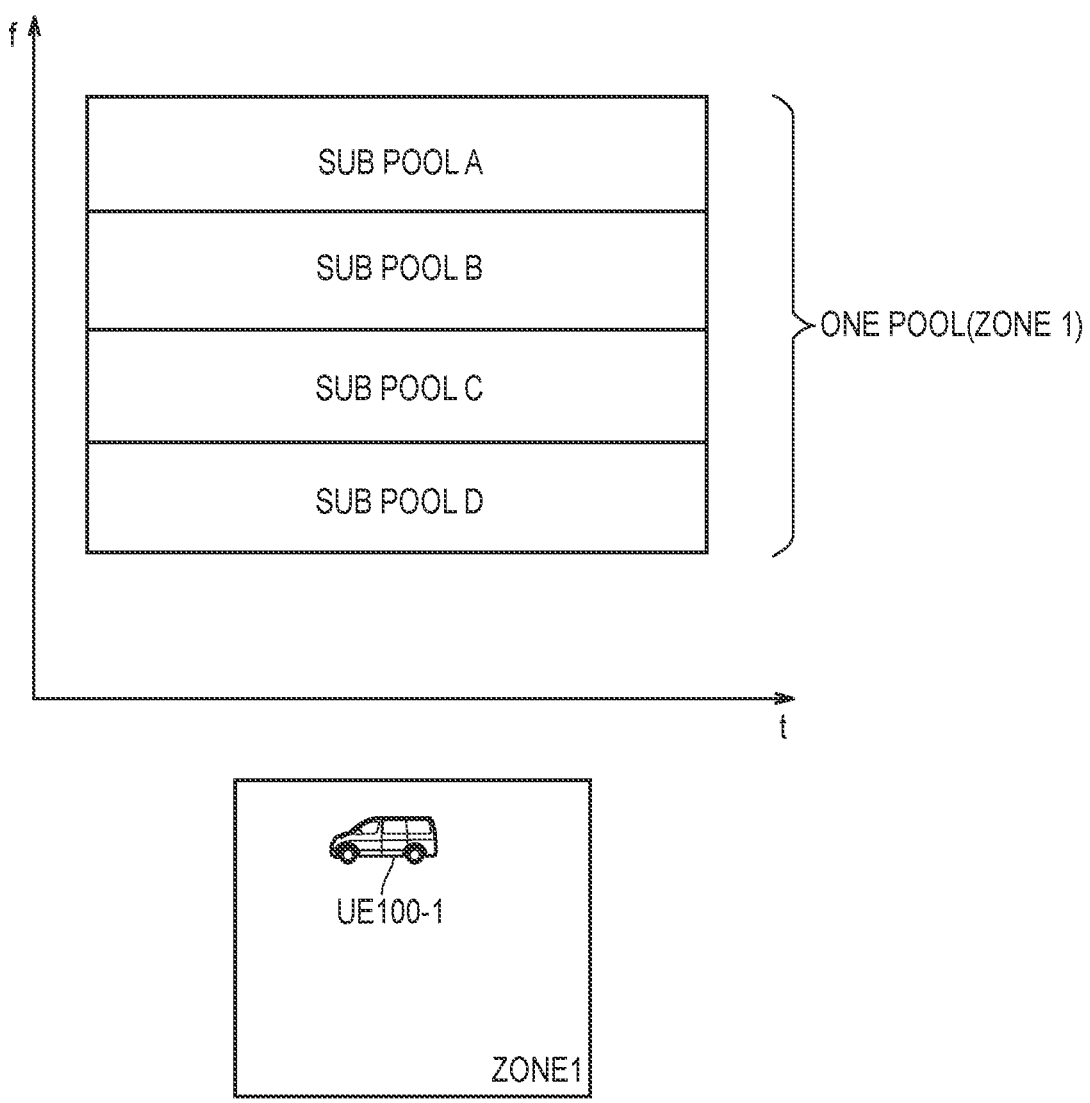
FIG. 11 is a diagram for describing an operation pattern 3.

The operation pattern 3 will be described with reference to FIG. 11. FIG. 11 is a diagram for describing the operation pattern 3. The description of content similar to the content described above will be omitted.

In the operation pattern 1, one zone is associated with a plurality of transmission resource pools. In the operation pattern 3, one zone is associated with one transmission resource pool.

As illustrated in FIG. 11, one zone is associated with one transmission resource pool. However, the one transmission resource pool includes a plurality of transmission resource regions (that is, sub-resource pools). That is, the plurality of transmission resource regions are included in one transmission resource pool.

Therefore, after selecting one transmission resource pool corresponding to the identified zone, the UE 100-1 selects any sub-resource pool from the plurality of sub-resource pools in the transmission resource pool. The method in which the UE 100-1 selects the sub-resource pool from the plurality of sub-resource pools is similar to the operation pattern 1 (patterns 1 and 2) described above. Therefore, the "transmission resource pool" may be replaced with "sub-resource pool" in the description above.

Even if one zone and one transmission resource pool can be associated with each other only in a one-to-one relationship, the UE 100-1 can reduce collisions between radio signals in the device-to-device communication, similarly to the above.

(D) Operation Pattern 4

The operation pattern 4 will be described with reference to FIG. 12 and FIG. 13. FIG. 12 is a diagram for describing the operation pattern 4. FIG. 13 is a flowchart for describing the operation pattern 4. The description of content similar to the content described above will be omitted.

In the operation pattern 4, in principle, the UE 100-1 selects (uses) a transmission resource pool associated with the zone similarly to the operation patterns 1 and 2 described above. On the other hand, if being located in a special area, the UE 100-1 exceptionally selects (uses) a special transmission resource pool. An operation environment of the operation pattern 4 is similar to that of the operation pattern 1.

As illustrated in FIG. 12 and FIG. 13, in step S210, the UE 100-1 determines whether or not the UE 100-1 is located in a special area.

The special area is an area where an exceptional transmission resource pool (special transmission resource pool: special pool) can be selected. For example, the special area is an area where a degree of danger is higher than in a normal area (for example, an area where accidents frequently occur). The special area is an area including, for example, an intersection or a merging point with a highway and the like. The special area may be changed not only by the structure of the road, but also by a utilization state of the road, a period of time (such as morning, afternoon, late night, and the position of the sun).

The special area may be divided into a plurality of sub-areas according to the degree of danger. For each sub-area, a different exceptional transmission resource pool (special pool) may be associated. In this case, the higher the degree of danger, the smaller the sub-area may be. The lower the degree of danger, the larger the sub-area may be. Therefore, for example, the higher the average speed (speed limit) of the UE (for example, a vehicle) in the area, the smaller areas the special area may be divided into. The lower the average speed (speed limit) of the UE in the area, the larger areas the special area may be divided into (or the special area may not be divided). The higher the density of UEs (for example, vehicles) in the area, the smaller areas the special area may be divided into. The lower the density of UEs (for example, vehicles) in the area, the larger areas the special area may be divided into.

The closer an approach to a point with a high degree of danger (for example, a vehicle road) within the special area, the smaller areas the special area may be divided into. The farther away from a point with a high degree of danger (for example, a vehicle road) within the special area, the larger areas the special area may be divided into.

The UE 100-1 may receive information about the special area from the eNB 200. The information about the special area may be pre-configured for the UE 100-1.

The UE 100-1 executes the process of step S220, in accordance to the UE 100-1 not being located in the special area (that is, being located in the normal area). The UE 100-1 executes the process of step S230, in accordance to the UE 100-1 being located in the special area.

In step S220, the UE 100-1 selects a transmission resource pool associated with the zone. The UE 100-1 may select the transmission resource pool similarly to each of the above-described operation patterns. For example, the UE 100-1 selects the pool A associated with a Zone 1.

In step S230, the UE 100-1 may select a special transmission resource pool (special pool). That is, the UE 100-1 may select a different transmission resource pool from the transmission resource pool associated with the zone. The special pool may be a transmission resource pool associated with the special area. The special pool may be a transmission resource pool not associated with the zone. The special pool may be a transmission resource pool to be used only if the UE 100-1 is located in the special area. For example, the UE 100-1 selects a pool B associated with the special area.

The UE 100-1 may be able to select the special pool only if transmitting specific transmission data. The special transmission data is, for example, transmission data with high priority. The special transmission data is, for example, transmission data for emergency. If the UE 100-1 can not select a special pool, the UE 100-1 may select a transmission resource pool associated with the zone.

In step S240, the UE 100-1 can use resources in the selected transmission resource pool to transmit the transmission data.

As described above, the UE 100-1 can select the special transmission resource pool in accordance with being located in a special area (for example, an area with a high degree of danger). As a result, the UE 100-1 can reduce the possibility of collisions between radio signals, as compared with a case where only a transmission resource pool corresponding to one zone can be selected.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the operation pattern 2, the UE 100-1 selects one piece of configuration information from the plurality of pieces of configuration information, however, this is not limiting. The UE 100-1 may select the plurality of parameters and/or calculation expressions from a plurality of parameters and/or a plurality of calculation expressions for defining a zone. The plurality of parameters may be at least one of the length of the zone, the width of the zone, the number of zones, and the size of the smallest zone.

In the description above, a transmitting UE is described as an example, however, this is not limiting. A receiving UE attempting to receive transmission data in device-to-device communication may also execute a similar operation to that of the transmitting UE. The receiving UE may execute monitoring in (at least some of) all selectable (transmission) resource pools. As a result, the receiving UE can receive a radio signal from the transmitting UE.

In the description above, examples of the transmission and/or reception of a direct radio signal between UEs (direct signaling) include V2V communication, and V2X communication, however, this is not limiting. The sidelink (proximity-based service) may be utilized for direct signaling of radio signals between UEs. For example, the above-described operation may be executed in transmission/reception of a direct radio signal such as a Discovery signal (message) and PC5 signaling.

The operation (each operation pattern) according to the above-described embodiments may be combined to be executed, where appropriate. In each of the above-described sequences, all of the operations may not be necessarily essential. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program on a computer. The computer-readable medium recording therein the program may be a non-transitory recording medium. The non-transitory recording medium may include, but not be limited to, a recording medium such as a CD-ROM and a DVD-ROM.

A chip may be provided which includes: a memory for storing a program for executing each process performed by any one of the UE 100 and the eNB 200; and a processor for executing the program stored in the memory.

In the above-described embodiments, an LTE system is described as an example of the mobile communication system; however, the LTE system is not an exclusive example, and the content according to the present application may be applied to a system other than the LTE system.

(Supplementary Note)
(1. Introduction)
A UE should use its geographical information to acquire the appropriate V2V transmission resources for Mode 1 V2V resource allocation (geo-location information reporting&location-based resource allocation) and Mode 2 (zone concept).

In this supplementary note, the case when the geo-location information is not available at the UE is investigated.

(2. Discussion)
(2.1. Missing Geo-Location Information)
The zone concept can achieve the appropriate V2V transmission resource allocation based on the UE's geo-location information. So the UE can avoid the collision with other UE's V2V transmission resource and mitigate the impact of in-band emission. Considering this aspects, the geo-location information based resource allocation is efficient, however, it will also be necessary to consider the UE's behaviour when the UE can't acquire its geo-location, e.g. within a long tunnel where without access to GNSS signal, car accidents, etc. If the UE can't receive its geo-location information, the current zone id using the equation for the zone concept cannot be determined by the UE and the appropriate V2V transmission resource cannot be selected. Therefore, UEs that cannot acquire geo-location information may have no means to perform V2V transmission and avoid the dangerous condition. In order to avoid this condition, some clarification to the UE behaviour needs to be defined to allow the UE to transmit the V2V signals without geo-location information.

Observation 1: It's necessary to consider a means for the UE to determine the appropriate V2V transmission resources when geo-location information is not available.

(2.1.1. Exceptional Resource for Zone Concept)
One of the ways for the eNB to provide the V2V transmission resource to the UE without geo-location information will be to introduce an exceptional resource for the zone concept. When the UE can't acquire its geo-location information and cannot determine the appropriate zone id, the UE may use the exceptional resource for the V2V transmissions. Since the zone concept is applicable to both out-of-coverage and in-coverage scenarios, the exceptional resource should also be provided for both scenarios. And since the zone-related parameters may be different between the two scenarios, i.e. Length, Width and Number of zone, are different between out-of-coverage and in-coverage, for the out-of-coverage scenario, the exceptional resource should also be pre-configured with similar zone-related parameters and the exceptional resource for the in-coverage scenario should be provided from the serving cell with its own zone-related parameters.

Proposal 1: Exceptional resource for the zone concept should be introduced so that the UE without geo-location information may continue to perform V2V transmissions.

The statement "We will introduce new SIB for V2X" is determined, so at least the zone-related pools, i.e. the location specific resources, will be provided in the new SIB. The exceptional resources will not be the location specific resources, so it's possible for the UE without geo-location information to reuse the legacy Sidelink resources, i.e. the resources provided in SIB18, as the exceptional resources for the zone concept. However, taking into account the characteristic of the V2V traffic, it agreed "SA pool and its associated data pool can be FDMed" and the advantages of FDMed pool are mentioned as "SA and data pools are subject to similar levels of in-band emissions", "Low-latency transmissions can be served without an increase in overhead" and "Flexible design that allows for mixtures of periodic and aperiodic traffic", so the resource pools for V2V in the new SIB may have such new characteristic to treat the V2V traffic. It may be worth considering whether the exceptional (SC/Data) resources should have the similar structure to the non-exceptional (SC/Data) resource pools for V2V.

Proposal 2: Exceptional resource for the zone concept should have the similar structure to the non-exceptional (SC/Data) resource pools for V2V.

(2.1.2. Switching to the Mode 1 Transmission)

Without geo-location information, it's difficult for the serving cell to determine the appropriate V2V transmission resource to allocate to the UE without impacting in-band emission. However, if the eNB can estimate the UE's geo-location information through one of the Location Service (LCS) such as OTDOA, the eNB can provide estimated UE's geo-location information or the zone id to the UE and the UE continues the zone-based mode 2 transmission. Another way to provide the V2V transmission resource to the UE without geo-location information will be to quit mode 2 transmission based on the zone concept and initiate the mode 1 transmission. In any case, if the UE can't acquire its geo-location information, it's useful for UE to inform the eNB of this situation and the need for the assistance from the eNB, regardless of which solution is used to allocate the appropriate resource pool.

For the in-coverage scenario, introducing the exceptional resource for the zone concept and switching to the mode 1 transmission are both efficient for the UE missing the geo-location information, so it could be up to the eNB implementation how best to provide the assistance to the UEs without geo-location information.

Proposal 3: Switching from the zone based mode 2 transmission to the mode 1 transmission may be used for the V2V transmission when the UE is missing its geo-location information.

Proposal 4: Serving cell should provide either the exceptional resource for the zone concept or the indication to switch the mode 1 transmission for the UE missing the geo-location information.

The invention claimed is:

1. A communication device, comprising:
a controller and a transmitter, wherein
the controller is configured to:
  select, according to a priority of transmission data to be transmitted using a direct radio signal, configuration information for calculating at least a size of a zone, the zone being a geographical section where the communication device is located;
  identify the zone based on the selected configuration information; and
  select a predetermined transmission resource region from a plurality of transmission resource regions included in one transmission resource pool associated with the identified zone, and
the transmitter is configured to transmit the transmission data using the direct radio signal to another communication device by using a resource in the predetermined transmission resource region, wherein
the controller is further configured to:
  select, as the configuration information, configuration information for which the size of the zone is calculated to be small when the priority of the transmission data is high, and
  select, as the configuration information, configuration information for which the size of the zone is calculated to be large when the priority of the transmission data is low.

2. The communication device according to claim 1, wherein
the controller is configured to perform a measurement of a radio signal in the plurality of transmission resource regions, and
the controller is configured to select the predetermined transmission resource region in accordance with a result of the measurement.

3. The communication device according to claim 2, wherein
the controller is configured to select the predetermined transmission resource region according to a congestion degree based on the result of the measurement.

4. The communication device according to claim 2, wherein
the controller is configured to select the predetermined transmission resource region based on a threshold value to be compared with the result of the measurement.

5. The communication device according to claim 1, wherein
the one transmission resource pool includes a plurality of transmission resource regions arranged in a frequency direction.

6. The communication device according to claim 1, wherein the controller is configured to:
  select the configuration information in accordance with a movement speed of the communication device; and
  select the predetermined transmission resource region from the plurality of transmission resource regions included in the one transmission resource pool, based on the selected configuration information.

7. A processor for controlling a communication device, wherein the processor executes:
  a process of selecting, according to a priority of transmission data to be transmitted using a direct radio signal, configuration information for calculating at least a size of a zone, the zone being a geographical section where the communication device is located;
  a process of identifying the zone;
  a process of selecting a predetermined transmission resource region from a plurality of transmission resource regions included in one transmission resource pool associated with the identified zone;

a process of transmitting the transmission data using the direct radio signal to another communication device by using a resource in the predetermined transmission resource region;

a process of selecting, as the configuration information, configuration information for which the size of the zone is calculated to be small when the priority of the transmission data is high; and a process of selecting, as the configuration information, configuration information for which the size of the zone is calculated to be large when the priority of the transmission data is low.

8. The communication device according to claim 1, wherein the controller is configured to select the predetermined transmission resource region from the plurality of transmission resource regions included in the one transmission resource pool based on whether the communication device is located in a danger area in which a degree of danger is higher than in a normal area.

* * * * *